(12) United States Patent
Levy

(10) Patent No.: US 8,436,770 B2
(45) Date of Patent: *May 7, 2013

(54) METHOD AND SYSTEM FOR VERIFYING THE PRECISION PERFORMANCE OF A SATELLITE NAVIGATION SYSTEM

(75) Inventor: Jean-Christophe Levy, Balma (FR)

(73) Assignee: Thales (FR)

( * ) Notice: Subject to any disclaimer, the term of this patent is extended or adjusted under 35 U.S.C. 154(b) by 116 days.

This patent is subject to a terminal disclaimer.

(21) Appl. No.: 13/046,175

(22) Filed: Mar. 11, 2011

(65) Prior Publication Data

US 2012/0062417 A1   Mar. 15, 2012

(30) Foreign Application Priority Data

Mar. 12, 2010   (FR) ..................... 10 00996

(51) Int. Cl.
*G01S 19/20* (2010.01)
(52) U.S. Cl.
USPC .................................................... 342/357.58
(58) Field of Classification Search ............ 342/357.45, 342/357.46, 357.58; 701/467, 468
See application file for complete search history.

(56) References Cited

U.S. PATENT DOCUMENTS

| | | | |
|---|---|---|---|
| 6,847,893 B1 | 1/2005 | Lupash | |
| 2011/0118979 A1* | 5/2011 | Mao et al. | 701/208 |
| 2011/0313614 A1* | 12/2011 | Hinnant et al. | 701/33 |
| 2012/0169541 A1* | 7/2012 | Singh | 342/417 |

OTHER PUBLICATIONS

Boriana Vassileva, et al., "SBAS Vertical Protection Level Assessment in the Case of Error Reduction", John Vincent Atanasoff 2006 International Symposium on Modern Computing, Oct. 1, 2006, pp. 137-142, XP031035961.
Todd Walter, et al., "Weighted RAIM for Precision Approach", Proceedings of the Institute of Navigation CPS, Sep. 1, 1995, pp. 1995-2004, XP002351332.
Benoit Roturier, et al., "Le Concept de SBAS Integrity Normalise Par l'OACI—Application a EGNOS", Navigation, Oct. 1, 2001, pp. 65-77, vol. 49, No. 196, Paris, FR, XP008068617.

* cited by examiner

*Primary Examiner* — Dao Phan
(74) *Attorney, Agent, or Firm* — Baker & Hostetler, LLP

(57) ABSTRACT

A method and a system verifies the precision performance of a satellite navigation system that can certify compliance with a level of precision whatever the observation conditions, notably as regards satellite geometry, and is a performance verification tool for the design, verification and qualification of a satellite navigation system.

10 Claims, 1 Drawing Sheet

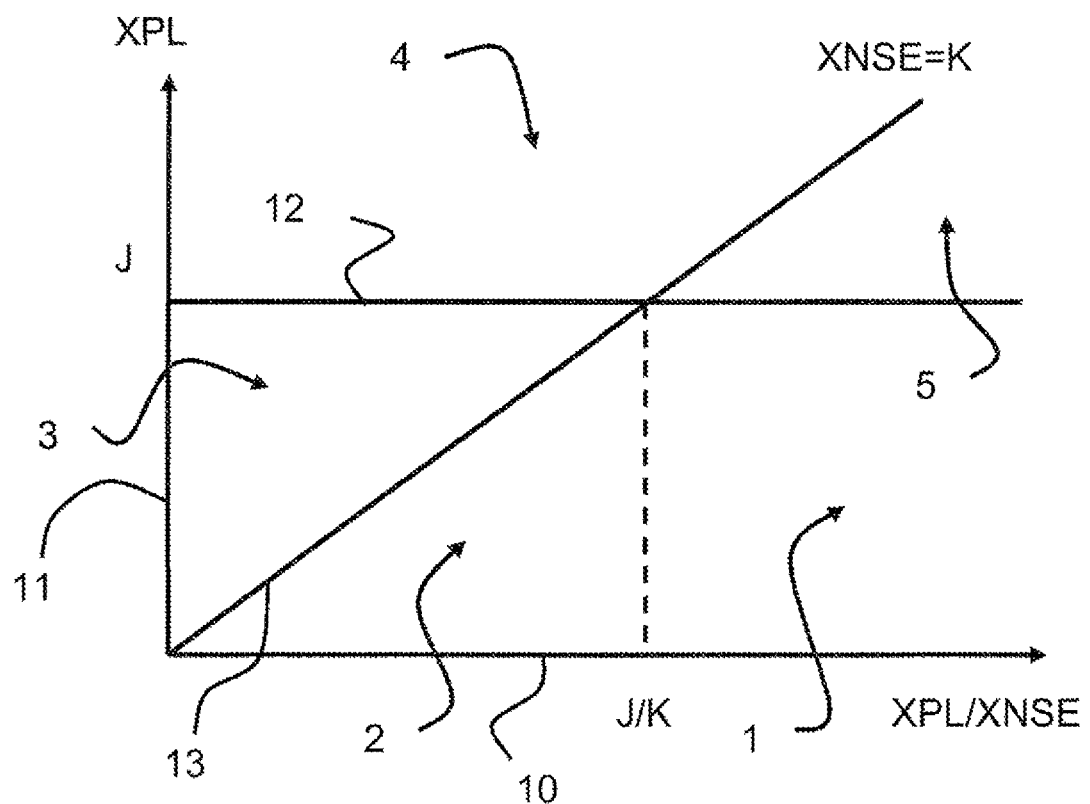

METHOD AND SYSTEM FOR VERIFYING THE PRECISION PERFORMANCE OF A SATELLITE NAVIGATION SYSTEM

CROSS-REFERENCE TO RELATED APPLICATION

This application claims priority to foreign French patent application No. FR 1000996, filed on Mar. 12, 2010, the disclosure of which is incorporated by reference in its entirety.

FIELD OF THE INVENTION

The invention relates to the field of satellite navigation systems and more particularly to a method for verifying the precision performance of such a system.

BACKGROUND

Currently, commercial services utilizing satellite navigation systems are expanding considerably. Products operating on the basis of radiolocation signals have become widely accessible in everyday home routine within motor vehicles for aiding road navigation initially and more recently within mobile telephone devices for a multitude of personal services. Upgrades to future satellite positioning systems, for example the GALILEO European system, promise much higher performance than current systems. Thus new services which were not able to be envisaged for lack of sufficient reliability and positioning precision are today conceivable for companies, notably road transport and air transport companies. For example, for road transport, efforts are under way to transform the economic models of the services for operating toll road sections by offering the customer personalized offers. For air transport companies, increased performance in terms of reliability and positioning precision allows the integration within aircraft of navigation devices on which pilots will be able to rely entirely. These devices will make it possible to considerably improve air transport safety. However, for services on which people's safety depends, it is mandatory to prove the reliability of the data sent by the positioning system. This is why operators of satellite navigation systems are made subject by the authorities to requirements regarding guaranteed service to the end customer.

Satellite navigation systems are characterized by performance data relating to integrity, precision and coverage. Integrity is a measure of confidence in the information provided by the satellite positioning system. A well known tool for determining the integrity of a point provided is the Stanford chart. The Stanford chart is a two-dimensional matrix whose input parameter on the horizontal axis is the observed position error vertically or horizontally and whose input parameter on the vertical axis is the protection level vertically or horizontally calculated on the basis of statistical models. This chart makes it possible to verify the proportion of measured samples whose observed position error is lower than the protection level.

The precision of a position is defined by the position error estimated with respect to the actual position. The precision of the location depends notably on the error in the estimated distance between the user and the satellites received as well as on the configuration of the geometry of the measurements. There exists a value, commonly called the DOP for "Dilution of Precision", which is indicative of the conditions of geometry of the measurements. When the value of the DOP is high, this indicates that the satellites used to obtain the position are close and therefore that the geometry is bad and when the value of the DOP is low this indicates that the satellites used to obtain the position are distant and therefore that the geometry is good.

The bodies responsible for regulations and checks relating to civil aviation require rigorous levels of performance notably as regards precision performance for critical services. Among these critical services utilizing the geo-location data of satellite positioning systems, the LPV200 service ("Localizer Performance with Vertical Guidance") requires that the satellite positioning system show for at least 95% of the time a location error vertically of less than 4 meters and horizontally of less than 16 meters. Moreover, this service requires that the probability of providing a location error vertically of greater than 10 meters be less than $10^{-7}$ under normal conditions and that the probability of providing a location error of greater than 15 meters be less than $10^{-5}$ under deteriorated conditions. This service is associated with an alert level vertically at 35 meters and horizontally at 40 meters.

The certified precision levels have been obtained by measuring samples under known sampling conditions, notably as regards measurement geometry. Now, no tool for measuring precision currently exists which allows these levels of requirement to be certified to the user since the precision performance also depends on the satellite geometry, and the data collected do not take into account all cases of satellite geometry for each user.

A solution implemented by the service operator of the American satellite positioning system for certifying a level of precision to each user and taking into account all the configurations of satellite geometry has been to collect data over a period of long duration. Satellite data have been collected for three years in order to be able to assert that all cases of satellite geometry have been observed. However, this scheme presents the disadvantage of mobilizing significant resources, and moreover does not guarantee that it has been possible to observe all cases.

SUMMARY OF THE INVENTION

The invention provides a tool for checking the precision performance of a satellite positioning system so as to be able to verify that the system meets the requirements imposed by the critical applications for each user whatever the conditions of observation of the radiolocation signals.

More precisely, the invention relates to a method for verifying the location precision performance of a satellite navigation system comprising a space segment transmitting radiolocation signals to a receiver segment. The method comprises the following steps:

A prior step of measuring the estimated error of location of the receiver of the system for a plurality of samples and of calculating the maximum location error threshold, called the protection radius, that can be guaranteed by the system for the said samples, the estimated error and the protection radius being defined in a dimension of a position frame of reference, A step of calculating a first proportion of samples satisfying the following conditions:
i. the protection radius is less than an alert threshold,
ii. the quotient of the protection radius and of the estimated location error is greater than a safety quotient, the safety quotient being the ratio of the alert threshold to a level of requirement of estimated error, A step of calculating a second proportion of samples satisfying the following conditions:
i. the protection radius is less than the alert threshold, ii. the quotient of the protection radius and of the estimated location error is less than the safety quotient,
iii. the estimated location error is less than the level of requirement of estimated error, A checking step of comparing the first and the second proportion of samples with a requirement proportion so as to verify the precision performance of the satellite navigation system.

The expression proportion of samples is understood to mean a number of samples in regard to a set of observed samples.

When the first proportion of samples is greater than a requirement proportion having to be guaranteed by a navigation service to a user, it is certified to a user that the navigation system complies with the service level related to the level of requirement of estimated location error.

Preferably, it also comprises a step of calculating a third proportion of samples satisfying the following conditions:
i. The protection radius is less than the alert threshold,
ii. the quotient of the protection radius and of the estimated location error is less than the safety quotient,
iii. the estimated location error is greater than the level of requirement of estimated error.

Preferably, it also comprises a step of calculating a fourth proportion of samples satisfying the following conditions:
i. The protection radius is greater than the alert threshold,
ii. The estimated location error is greater than the level of requirement of estimated error.

Preferably, it also comprises a step of calculating a fifth proportion of samples satisfying the following conditions:
i. The protection radius is greater than the alert threshold,
ii. The estimated location error is less than the level of requirement of estimated error.

Advantageously, the proportions of samples are calculated for at least two levels of requirement of estimated location error.

Advantageously, the proportions of samples are calculated for at least two alert thresholds.

The invention also relates to any system able to implement the method for verifying the location precision performance of a satellite navigation system according to any one of the previous variants.

Advantageously, it comprises display means for representing in a chart location samples for a receiver of a satellite navigation system, the said chart representing:
On a first axis, the quotient of the protection radius and of the estimated location error, defined in a dimension of a position frame of reference,
On a second axis the protection radius,
A first straight line representing the estimated location error for a fixed level of requirement of the estimated location error,
A second straight line representing an alert threshold of the protection radius.

Advantageously, the samples are displayed in the chart according to a representation code dependent on the first and on the second proportion of samples.

The verification method makes it possible to check that a satellite navigation aid system complies with the requirements expected of the system for a given service and does so, in the case where the survey of samples of location data satisfies the test positively, while being certain that these requirements are complied with whatever the conditions of observation of the signals as regards satellite geometry. Thus, the use of a system implementing the verification method makes it possible to put in place a tool for checking precision performance without recourse, however, to phenomenal resources for calculation and measurements which, moreover, would not make it possible to guarantee all satellite geometry configurations. According to the test results on the location samples for a receiver, it is possible to assert that all the satellite geometry configurations are complied with for an alert threshold of given protection radius, this not being the case with the prior art solutions. When the majority of the sample proportion is located in a zone of the chart where a deterioration in the satellite geometry would drive the estimated location error beyond the alert threshold of the protection radius then it is not useful to know the precision performance since the location measurements cannot be utilized for a critical service limited by this alert threshold.

BRIEF DESCRIPTION OF THE DRAWINGS

The invention will be better understood and other advantages will become apparent on reading the nonlimiting description which follows and by virtue of the sole accompanying FIGURE representing a verification method in the form of a chart making it possible to check that the satellite navigation aid system complies with the expected requirements as regards precision performance.

DETAILED DESCRIPTION

Service providers utilizing radiolocation signals of satellite navigation systems expect of these systems, on the one hand, ever higher performance and, on the other hand, service continuity and alert capabilities making it possible to warn a user of the service when the performance does not meet the expected requirements. Solutions for verifying performance currently exist for checking the integrity of a satellite navigation system whatever the conditions of observation of the signals for a user, but for the verification of precision performance, existing tools cannot guarantee it under all observation conditions since each user utilizes the radiolocation signals in a particular configuration depending on his position, on the moment of observation and on the state of the satellites seen to calculate his position.

The principle of satellite navigation systems location is briefly recalled. In a satellite navigation system, the time taken by the radiolocation signal transmitted by the satellite to reach the receiver to be located is used in order to determine the distance, called the pseudo-distance, between this satellite and this receiver, the signal containing the position data for the satellites. On the basis of the processing of the radiolocation signals transmitted by several satellites seen by a user, the latter is capable of ascertaining his position. The bigger the number of satellites and the lower the value of the DOP, the better is the precision of the position. The precision depends notably on the disposition of the satellites, the precision parameters of the clocks of the satellites, the atmospheric layers crossed and the precision of the corrections made.

A service of level LPV200 requires the following performance. It is required that the satellite navigation system show for at least 95% of the time a location error vertically of less than 4 meters and horizontally of less than 16 meters. Moreover, this service requires that the probability of providing a location error vertically of greater than 10 meters be less than $10^{-7}$ under normal conditions and that the probability of providing a location error of greater than 15 meters be less than $10^{-5}$ under deteriorated conditions. The LPV200 service level imposes an alert threshold horizontally equal to 40 meters and an alert threshold vertically equal to 35 meters.

The invention proposes a method for verifying precision performance making it possible to guarantee such precision performance whatever the conditions of observation of the radiolocation signals and also makes it possible to configure the method so as to satisfy any other level of requirement as regards position, as regards vertical or horizontal location. The single FIGURE graphically represents the calculations carried out for the verification of a batch of samples as regards precision.

The FIGURE represents a chart of the location samples for a receiver of a satellite navigation system. It represents on a first axis horizontally 10 the quotient of the calculated maximum error threshold (commonly called the protection radius, a term that we will use subsequently for ease of drafting) and of the estimated location error, the quotient being displayed as a legend by the reference XPL/XNSE and being defined in a dimension of a position frame of reference. If the quotient of the protection radius and of the estimated location error had been represented in the vertical frame of reference, then the quotient would have been represented by the value VPL/VNSE and in the horizontal plane by HPL/HNSE. The protection radius XPL is obtained by calculation algorithm.

The protection radius may be obtained according to various schemes which are known to the person skilled in the art and the choice of the scheme does not constitute within the framework of the invention a limitation of the scope of the patent. For example, the protection radius may be determined on the basis of the integrity level of the satellite navigation system. The protection radius represents the possible positions in a given plane around the actual position, more exactly it is guaranteed by calculation that it will not be possible for a calculated position to be located beyond the actual position plus the protection level in a given plane.

The estimated location error XNSE is the difference between the actual position of a receiver, known precisely by various means, and the position estimated on the basis of the processing of the radiolocation signals transmitted by the satellites. For example, the position of a reception beacon of GBAS type (for "ground-based augmentation system") forming part of a satellite navigation system is known precisely. The estimated location error may be obtained according to various schemes which are known to the person skilled in the art and the choice of the scheme does not constitute within the framework of the invention a limitation of the scope of the patent.

The level of requirement of the location error K corresponds to the location error that the navigation system must not exceed for 95% of the time. By way of indicative example, depending on the criticality of the service, the error requirement level may be 4 meters for 95% of the samples, 10 meters for a probability of $1.10^{-7}$ under normal conditions and 15 meters for a probability of $1.10^{-5}$ under deteriorated conditions. The requirement level can vary according to the dimension of the position frame of reference.

The chart represents on a second axis 11 vertically the protection radius XPL. The chart therefore represents the location data samples positioned in the chart horizontally as a function of the quotient of the protection radius XPL and of the location error XPL and vertically as a function of the protection radius. The alert threshold J is represented graphically in the chart by the straight line 12 and the level of requirement of estimated error K is represented by the straight line 13. The claimed method for verifying precision performance consists in calculating the proportion of samples in various categories of the chart, which are defined in the following paragraphs. It is recalled that the problematic issue of measuring precision performance depends for each user on the satellite geometry, evaluated through the DOP value. The benefit of the chart representation is to be able to view the variation in the DOP. This variation is characterized in the chart by a vertical movement of the samples. When the DOP satellite geometry value increases, the data samples shift vertically upwards in the chart. Indeed, if the DOP value increases, the protection radius increases but the quotient XPL/XNSE remains invariant since it does not depend on the DOP, in the domain of the positions the protection radius XPL being equal to the multiplication DOP*integrity and the location error being equal to the multiplication DOP*pseudo-distance error. If the DOP decreases, the protection radius decreases and the samples shift vertically downwards.

A first category 1 calculated by the verification method comprises the samples complying with the following two conditions: the protection radius XPL is less than the alert threshold J of the service and the quotient XPL/XNSE of the protection radius and of the estimated location error is greater than the safety quotient J/K, the safety quotient being the ratio of the alert threshold J to a level of requirement of estimated error K. For these data samples, it is deduced that when the DOP varies, the samples shift vertically upwards in the case of deterioration in the geometry conditions and downwards in the case of improvement in the geometry conditions. Consequently, the samples located in this category 1 comply with the location error requirement whatever the DOP, and if the DOP deteriorates so that the location error requirement K is not complied with, then the samples necessarily exceed the alert threshold J required by the service. This therefore signifies that either the level of requirement in error is complied with and thus it is certainly complied with whatever the DOP, or the level of requirement is not complied with and thus in any case the navigation service is not usable since the alert threshold is exceeded. Therefore if the calculated samples comply with the conditions of category 1 in an observed DOP condition then the precision performance is complied with whatever the DOP observation condition of a user. By virtue of the method it is therefore possible to determine it without having to measure all the observation conditions.

A second category 2 comprises the samples complying with the following three conditions: the protection radius is less than the alert threshold J, the quotient XPL/XNSE of the protection radius and of the estimated location error is less than the safety quotient J/K and the estimated location error XNSE is less than the level of requirement of estimated error K. For these data samples, it is deduced therefrom that the level of requirement in location error is potentially complied with. However, if the DOP value increases, the location error for certain samples may become greater than the level of requirement of the estimated error K whereas under a condition of initial DOP value the location error was lower. By calculating the samples in category 2, it is determined whether the precision performance is complied with for known observation conditions. However, it is not possible to guarantee it for all the users, notably for users who position themselves under deteriorated observation conditions relative to the sample measurement conditions.

A third category 3 comprises the samples complying with the following three conditions: the protection radius XPL is less than the alert threshold J, the quotient XPL/XNSE of the protection radius and of the estimated location error is less than the safety quotient J/K and the estimated location error is greater than the level of requirement of estimated error K. For these data samples, it is deduced therefrom that the level of requirement in location error is not complied with. However, if the DOP value decreases, the location error for the samples may become less than the level of requirement of the estimated error K for certain samples whereas under a condition of initial DOP value the location error was higher. In the case of deterioration in the satellite geometry, the performance may become such that the protection radius no longer complies with the alert threshold. The navigation system must then no longer be used and the user is warned.

A fourth category 4 comprises the samples complying with the following two conditions: the protection radius XPL is greater than the alert threshold J and the estimated location error XNSE is greater than the level of requirement of estimated error K. For these data samples, the protection radius XPL is greater than the alert threshold J. If the sample proportion in this part is high then the navigation system must no longer be used since it exhibits too dangerous a location uncertainty for the user service. The system is then considered to be unavailable for these samples.

A fifth category 5 comprises the samples complying with the following two conditions: the protection radius XPL is greater than the alert threshold J and the estimated location error XNSE is less than the level of requirement of estimated error K. If a large proportion of the samples is positioned in this category, then the navigation system can no longer be used since the protection radius XPL is greater than the alert threshold J whereas the location error XNSE complies with the level of requirement K.

The method for verifying precision performance is implemented by a system comprising the means for measuring the position location error and the means for calculating the protection radius. This system is particularly dedicated to the maintenance of a satellite navigation system and forms part of the systems of the ground stations. The monitoring and the analysis of the behaviour of the system as regards precision performance is facilitated by the displaying of the categories of samples 1 to 5 in a chart and the proportion of samples of a measurement survey in each of the said categories. Means of alert and of comparison of the sample proportions in each of the categories and preferably in category 1 makes it possible to certify compliance or otherwise of the precision whatever the DOP condition. Thus, it is not necessary to observe all the DOP conditions. Depending on the proportions of samples in the various categories, display means present the samples with colour codes representative of the behaviour and performance of the satellite navigation system.

The invention applies to a maintenance system for satellite navigation systems and more precisely to the tools for tracking the performance of satellite navigation systems. The invention applies to all satellite positioning systems; it is possible to cite for example the American system GPS ("Global Positioning System") or the future European system GALILEO, as well as performance augmentation systems (EGNOS for "European Geostationary Navigation Overlay Service").

The invention claimed is:

1. A method for verifying a location precision performance of a satellite navigation system comprising a space segment transmitting radiolocation signals to a receiver segment, comprising the steps:

Measuring, with a system, an estimated error of location of a receiver of the system for a plurality of samples and calculating a maximum location error threshold, being a protection radius, that can be guaranteed by the system for the samples, the estimated error and the protection radius being defined in a dimension of a position frame of reference, calculating, with the system, a first proportion of samples satisfying the conditions:
  i. the protection radius being less than an alert threshold,
  ii. a quotient of the protection radius and of the estimated location error being greater than a safety quotient, the safety quotient being a ratio of the alert threshold to a level of requirement of the estimated error, calculating, with the system, a second proportion of samples satisfying the conditions:
  iii. the protection radius being less than the alert threshold,
  iv. the quotient of the protection radius and of the estimated location error being less than the safety quotient,
  v. the estimated location error being less than the level of requirement of the estimated error, and a checking step of comparing the first and the second proportion of samples with a requirement proportion so as to verify a precision performance of the satellite navigation system.

2. The method according to claim 1, further comprising a step of calculating a third proportion of samples satisfying the conditions:
  i. the protection radius being less than the alert threshold,
  ii. the quotient of the protection radius and of the estimated location error being less than the safety quotient,
  iii. the estimated location error being greater than the level of requirement of the estimated error.

3. The method according to claim 2, further comprising a step of calculating a fourth proportion of samples satisfying the conditions:
  i. the protection radius being greater than the alert threshold,
  ii. the estimated location error being greater than the level of requirement of the estimated error.

4. The method according to claim 3, further comprising a step of calculating a fifth proportion of samples satisfying the conditions:
  i. the protection radius being greater than the alert threshold,
  ii. the estimated location error being less than the level of requirement of the estimated error.

5. The method according to claim 1, wherein the proportions of samples are calculated for at least two levels of requirement of estimated location error.

6. The method according to claim 1, wherein the proportions of samples are calculated for at least two alert thresholds.

7. The method according to claim 1, wherein, when the first proportion of samples is greater than a requirement proportion having to be guaranteed by a navigation service to a user, it is certified to a user that the navigation system complies with the service level related to the level of requirement of estimated location error.

8. A system for verifying a location precision performance of a satellite navigation system comprising:

a system measuring an estimated error of location of a receiver of the system for a plurality of samples and calculating a maximum location error threshold, being a protection radius, that can be guaranteed by the system for the samples, the estimated error and the protection radius being defined in a dimension of a position frame of reference, the system calculating a first proportion of samples satisfying the conditions:
  i. the protection radius being less than an alert threshold,
  ii. a quotient of the protection radius and of the estimated location error being greater than a safety quotient, the safety quotient being a ratio of the alert threshold to a level of requirement of the estimated error, the system calculating a second proportion of samples satisfying the conditions:

vi. the protection radius being less than the alert threshold,
vii. the quotient of the protection radius and of the estimated location error being less than the safety quotient,
viii. the estimated location error being less than the level of requirement of the estimated error, and the system comparing the first and the second proportion of samples with a requirement proportion so as to verify a precision performance of the satellite navigation system.

9. A system according to claim 8, comprising display means for representing in a chart location samples for a receiver of a satellite navigation system, said chart representing:

on a first axis the quotient of the protection radius and of the estimated location error, defined in a dimension of a position frame of reference, on a second axis the protection radius, a first straight line representing the estimated location error for a fixed level of requirement of the estimated location error, and a second straight line representing an alert threshold of the protection radius.

10. A system according to claim 9, wherein the samples are displayed in the chart according to a representation code dependent on the first and on the second proportion of samples.

* * * * *